United States Patent [19]

Kuemmerle et al.

[11] 3,988,545
[45] Oct. 26, 1976

[54] METHOD OF TRANSMITTING INFORMATION AND MULTIPLEXING DEVICE FOR EXECUTING THE METHOD

[75] Inventors: Karl A. Kuemmerle, Siebnen; Erich Port, Ruschlikon; Pitro A. Zafiropulo, Horgen, all of Switzerland

[73] Assignee: International Business Machines Corporation, Armonk, N.Y.

[22] Filed: Apr. 23, 1975

[21] Appl. No.: 570,890

[30] Foreign Application Priority Data
May 17, 1974 Switzerland.......................... 6780/74

[52] U.S. Cl. ......................... 179/15 BV; 179/15 BY
[51] Int. Cl.² .......................................... H04J 3/00
[58] Field of Search.......... 179/15 A, 15 BA, 15 BS, 179/15 BV, 15 BY, 15 BW, 15 AF

[56] References Cited
UNITED STATES PATENTS

| | | | |
|---|---|---|---|
| 3,668,645 | 6/1972 | Reymond | 179/15 BA |
| 3,725,590 | 4/1973 | Verstegen | 179/15 BS |
| 3,766,322 | 10/1973 | Moffett | 179/15 BV |
| 3,796,835 | 3/1974 | Closs | 179/15 BY |
| 3,886,317 | 5/1975 | Drapkin | 179/15 BY |

Primary Examiner—Kathleen H. Claffy
Assistant Examiner—Joseph A. Popek
Attorney, Agent, or Firm—Robert Lieber

[57] ABSTRACT

A method and a TDM multiplexer by which circuit-switched synchronous data and packet-switched asynchronous data are optimally combined for transmission over a common channel. Time slots of variable width are assigned to circuit-switched traffic, while the remaining capacity of the TDM frame is used for transmission of store-and-forward traffic which is inserted in the gaps between assigned time slots in the form of an intermittent bit stream.

9 Claims, 5 Drawing Figures

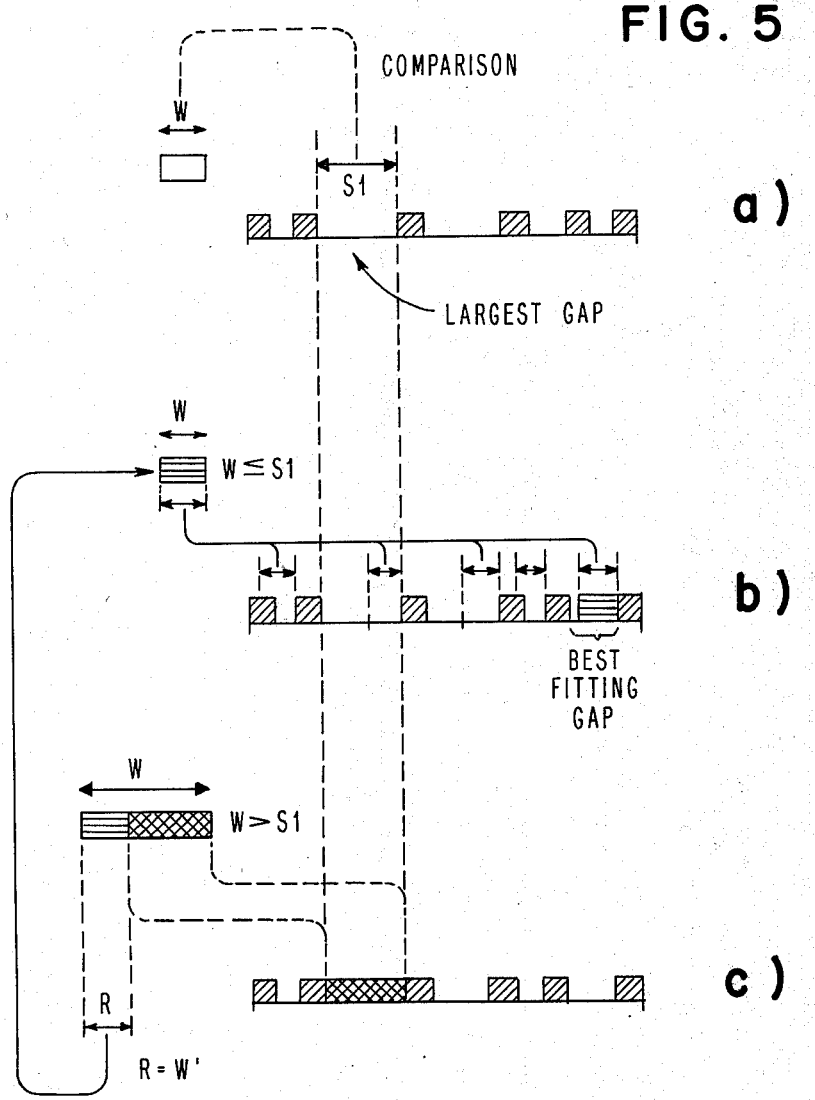

METHOD OF TRANSMITTING INFORMATION AND MULTIPLEXING DEVICE FOR EXECUTING THE METHOD

BACKGROUND OF THE INVENTION

The invention relates to a method of transmitting information from various sources over a common transmission means, and a multiplexing device for executing this method.

For transmission of digital information there are two different kinds of switching: circuit switching (line switching) and store-and-forward switching. In circuit switcing, previous to the transmission between two terminal stations a connection is established by signaling an information exchange which is then exclusively available and represents a "transparent" channel. Such connections are advantageous for continuous or synchronous traffic, but not for intermittent or interactive traffic. On the other hand, in store-and-forward switching no fixed connection is established. Data are formulated in blocks or "packets", transferred from node to node in a network, and intermediately stored at each node in a buffer. Additional data such as details on destination and source must be attached to the packets and associatively transferred and stored. Advantages of this kind of transmission are better line utilization and short response times. The transmitted data must, however, satisfy certain conditions (non-transparency) and one must put up with variable waiting times.

In communication systems for various information categories in which there are large variations in traffic volume, a combination of circuit switching and store-and-forward switcing, or of synchronous and asynchronous transmission is desirable. In principle, it would be possible to provide throughout the system parallel devices for both categories of transmission. This, however, is very expensive and does not give optimum utilization when there are large variations in the volume of traffic.

PRIOR ART

Time-division multiplex systems are known in the art in which over one line synchronous data of circuit-switched traffic as well as asynchronous, irregularly occurring data can be transmitted. In these systems, each time frame comprises fixedly formulated time slots a predetermined number of which are permanently assigned to synchronous traffic while the others are assigned to asynchronous traffic. With this arrangement, however, numerous situations are possible in which part of the transmission capacity is not utilized due to the fixed assignment.

In another time-division multiplex system known in the art a matrix switching arrangement is provided between input lines and output lines, the individual switches of which are controlled in accordance with stored switching control data. In this system connections of different bandwidths can be established so that various kinds of traffic can be accommodated. However, each individual connection, though it may be very short in time, must be particularly controlled and free transmission capacity must be found for it. Furthermore, this system is concerned with an exchange and does not solve the problem of optimum channel utilization.

OBJECTS AND SUMMARY

It is an object of the invention to devise a method and a device which allow the integration of various traffic categories in one transmission channel and afford optimum utilization of the available transmission bandwidth. This object is also to be achieved if there are large variations in volume in the different categories of traffic. Furthermore, it should be possible to establish circuit-switched connections of different bandwidth depending on current requirements without degradation of utilization.

Subject of the invention is a method of transmitting information from various sources over a common transmission means, the method being characterized in that:

data from a first subset of said sources are transmitted as circuit-switched traffic in periodic time slots of sequential time frames, said time slots being temporarily assigned to sources, the size of any time slot and its position within the frame cycle being determined in connection with its respective assignment, and that data from a second subset of said sources are intermediately stored as store-and-forward traffic in a buffer store, then sequentially extracted and transmitted in the form of an intermittent data stream in the gaps which are left in the time frame between time slots of the circuit-switched traffic, a new time slot being assigned to one of the sources of said first subset only if after such assignment the channel capacity left available to the store-and-forward traffic, which corresponds to the remaining gaps, is not less than a fixed minimum value.

A multiplexing device for carrying out the method is characterized by:

a. a plurality of source register means associated with the sources of the first subset, b. buffer storage means for storing and sequentially releasing data from associated sources of the second subset, c. assembler means for transferring data from said source register means and said buffer storage means to input means of the transmission means, d. first selection means for selectively activating source register means outputs to effect release of data elements to said assembler means in accordance with control data stored in a control store which is connected to the selection means, e. second selection means for activating the buffer storage means to release data elements to said assembler means if not data elements are released from said source register means and if no synchronizing or frame control characters are released.

The invention provides high flexibility in the integration of synchronous and asynchronous traffic by which optimum utilization is achieved, because both categories of traffic automatically fully complement each other in the combination, and because a free selection of bit positions within the time frames is possible for each time slot.

An embodiment of the invention is described next in connection with the accompanying drawings.

BRIEF DESCRIPTION OF THE DRAWINGS

FIG. 5 schematically illustrates the procedure for establishing a new time slot allocation between time slots already allocated in the time frame for circuit-switched transmission.

DETAILED DESCRIPTION

Figure 1:
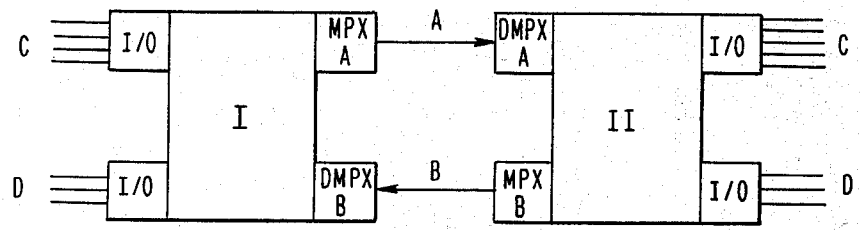
FIG. 1 is a schematic of a communication network environmental configuration for which the invention is suitable.

FIG. 1 shows schematically a communication situation for which the present invention is particularly suited. Between switching facilities I and II there is a duplex TDM transmission link comprising channels A and B for transmission in opposite directions. To each switching facility are connected on one hand continuously sending (or receiving) sources (or receivers) C, and on the other hand other sources (or receivers) D which deliver (or receive) data intermittently or at a low rate.

The sources (or receivers) may be directly attached devices or lines carrying data from (to) other switching facilities or centers. In the first case, FIG. 1 corresponds to a system comprising only two switching facilities through which subscribers at two locations remote from each other can be connected. In the other case, FIG. 1 corresponds to a section of a larger network having more than two nodes; the two switching facilities representing only two nodes of the network.

A tranmission over a switched connection (circuit-switched) is assumed to be most suitable for the sources of group C, and transmission in blocks or "packets" with intermediate storage (store-and-forward switching) is assumed to be most suitable for the sources of group D, as explained above in the introduction.

Figure 2:
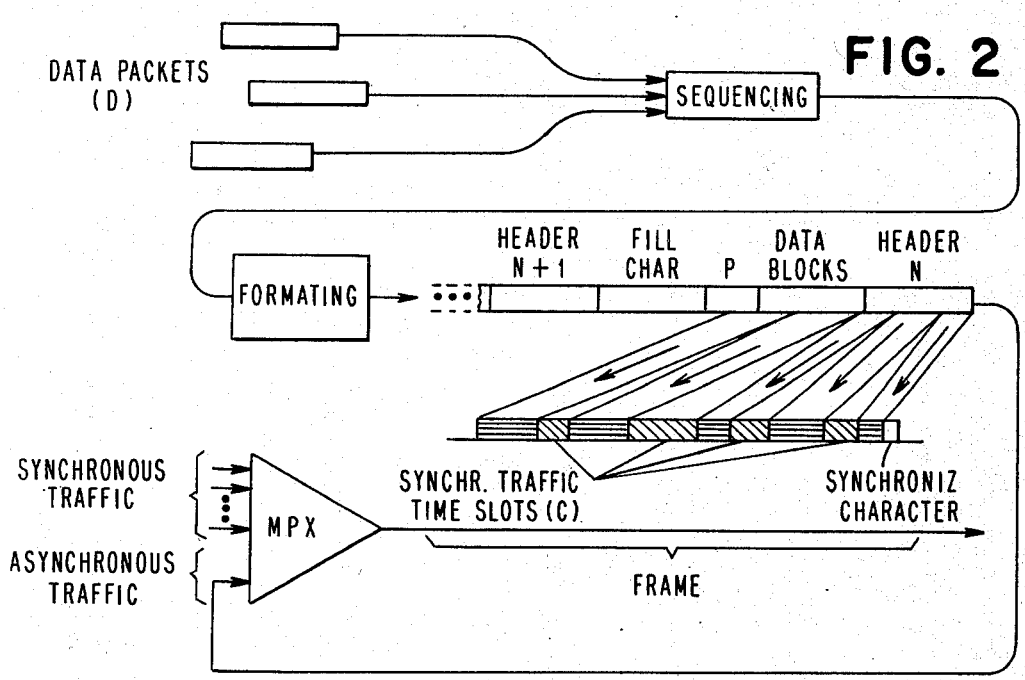
FIG. 2 schematically shows the process of integrating synchronous and asynchronous (or circuit-switched and store-and-forward-switched) traffic in accordance with the invention.

As presently contemplated data from the various sources is combined as shown in FIG. 2. Transmission is made in time division frames which sequentially and periodically follow each other and which are separated from each other by synchronizing characters, as in ordinary time-division multiplex handling. Depending upon requirement time slots in the frame are assigned for carrying circuit-switched traffic C (shown diagonally hatched), which in the following is also designated as synchronous traffic. These slots need not be of equal width. The width may be tailored to the bandwith required for the respective channel. Furthermore, successive time slots need not be contiguous in time. The allocation procedure is explained further below.

Data of the second traffic category D, which in the following is also designated as asynchronous traffic are put into sequence and queued in packet groups in a shift buffer store for sequential transmission. Of course, control and identification information (headers) must be added so that data from different sources can be correctly separated and distributed at the receiving end. Furthermore, check characters P and fill characters may be added. The contents of the buffer store is currently extracted to completely fill the gaps (horizontally hatched) between successive time slots assigned to synchronous traffic (diagonally hatched). In this maner the total frame capacity of the transmission channel can be utilized flexibly, yet optimally; i.e. completely.

Combination of the data occurs in a multiplexer which will be described in more detail below.

Figure 3:
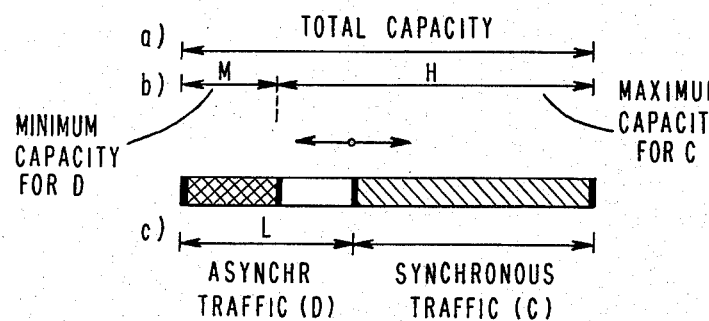
FIG. 3 diagramatically illustrates the variable assignment of the total transmission bandwidth to both categories of traffic.

FIG. 3 shows an important aspect of the present solution. The length of the bar represents the total available channel capacity (row a). One part of this is reserved as minimum capacity M for asynchronous traffic (row b left part), while the other part H is partly or wholly available — depending on the demand — for circuit-switched (synchronous) traffic (row b right part). The shaded bar c in FIG. 3 represents an exemplary situation: for direct (circuit-switched) traffic as much of the capacity H as is required is allocated (diagonally hatched, right side). For asynchronous traffic (intermediately stored data packets) all the remainder of the frame is available, i.e. first the minimal portion permanently reserved for asynchronous traffic (crosshatched), and additionally the portion currently not used for direct traffic (white).

Thus a movable time boundary is established between the two traffic categories, which is shifted depending on requirements and traffic volume.

The minimum capacity for asynchronous traffic (store-and-forward-switched) is designed so that this traffic is never completely blocked. On the other hand, direct traffic (circuit-switched) has priority in seizing all of the remainder H of the channel capacity.

The allocation of FIG. 3 is only illustrative. Actually, the frame is not divided into two parts, but — depending on current requirements — into multiple parts with circuit-switched parts non-contiguous, as in FIG. 2.

MULTIPLEXER

Figure 4:
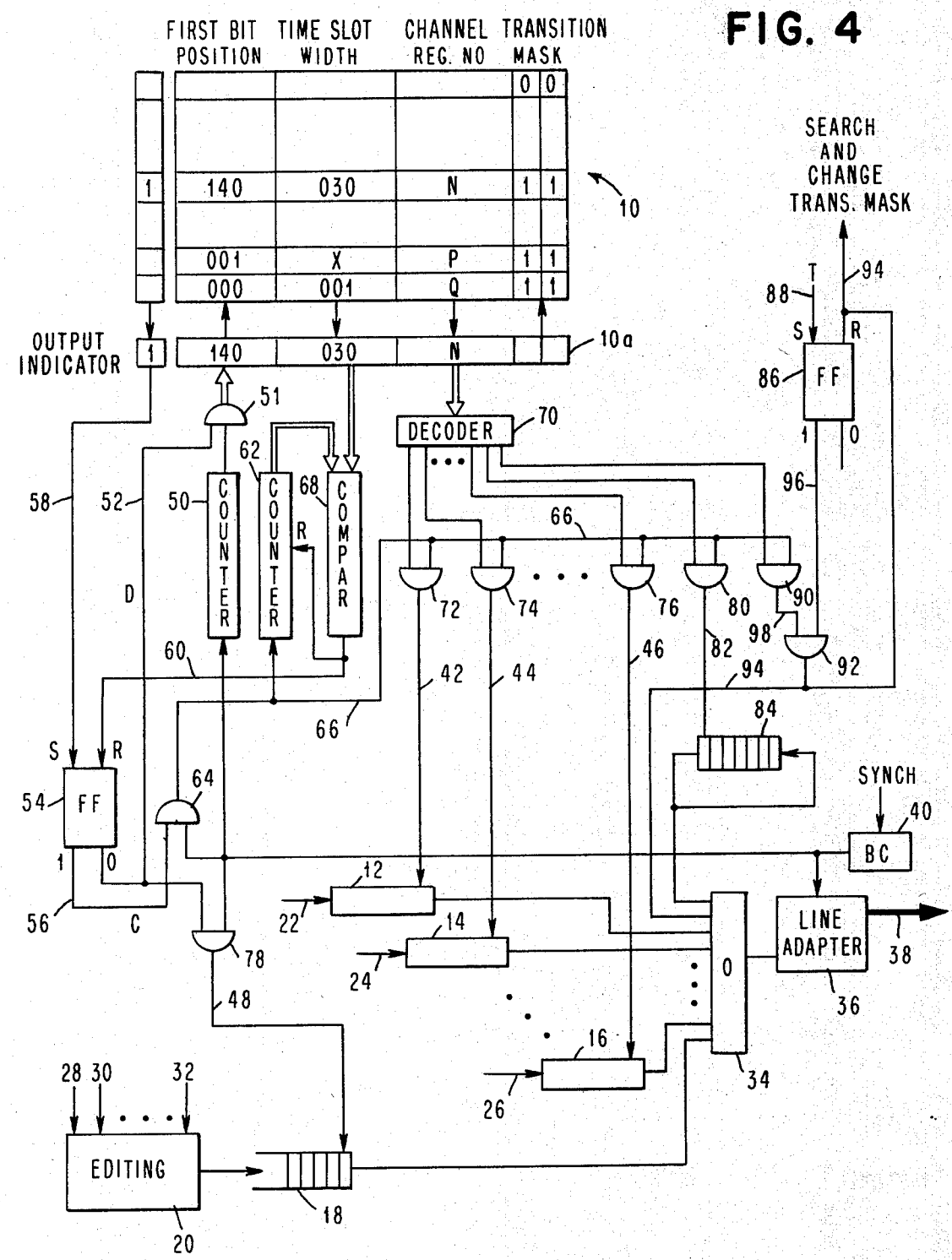
FIG. 4 is a block diagram of a multiplexing device according to the invention.

FIG. 4 shows details of a multiplexing device suited for execution of the inventive method which corresponds to the block MPXA in FIG. 1. An associative store 10 is provided for storing information on frame parts (time slots) and their assignments. Each row is associated with one time slot. The left field contains the number of the time slot's first bit position in each frame. The middle field contains the time slot width in form of a bit count. In the example shown the contents of the row in the middle corresponds to a time slot which comprises bit positions 140 through 169. The third field, on the right side, contains the address (or number) of the input (source) channel to which the respective time slot is assigned. The pair of bits on the extreme right of each row serves for indicating whether the row is active (11) or passive (00), and for masking transition states as explained further below.

Registers 12, 14, . . . 16 and buffer store 18 serve for receiving data from various sources, which are to be transmitted over a common line. Lines 22, 24, . . . 26 on which data arrive for synchronous connection are connected to the inputs of registers 12, 14, . . . 16. Connected to the input of buffer store 18 is editing means 20 the inputs of which are connected to lines 28, 30, . . . 32 on which irregularly occurring data (to be store-and-forward-switched) arrive. Editing means 20 arranges the data arriving on lines 28, 30, . . . 32 in consecutively sequenced data packets, adding identification and control information. It releases a stream of consecutive bits to buffer 18. If temporarily no data arrive, fill characters are inserted to maintain the stream of bits.

Outputs of registers 12, 14, . . . 16 and buffer 18 are connected to an OR gate 34 which releases on its single output line a data stream to line adapter circuit 36, which in turn is connected to transmission line 38. A bit clock (BC) 40 is provided for synchronizing. It can in turn be synchronized by a central clock (synch) signal. Registers 12, 14, . . . 16 and buffer 18 have output gates which are controlled from associated control lines 42, 44, . . . 46 for releasing data.

Control circuitry, which is described below, is provided for generating control signals on these lines in accordance with control data contained in store 10.

An input/output register 10a is attached to associative store 10. A value set into the left field (e.g. 140) is compared to the contents of all corresponding fields in associative store 10. If a match occurs a selector is set which belongs to the respective row. Thereafter, the contents of the second and the third field (030 and N) of the respective row is transferred to input/output register 10a, and the output indicator combined with this register is set.

A first counter 50 is connected to bit clock 40 so that it is advanced by one unit at each bit clock time. The output of counter 50 is connected through gate circuit 51 to the first field of I/O register 10a so that with each activation of control signal D on line 52 the value currently held in the counter is transferred into the I/O register. Line 52 is connected to one of the two complementary outputs of control flipflop 54. To the other output a line 56 is attached. The control flipflop further has a SET input with a line 58 and a RESET input with a line 60. Line 58 is connected to the output indicator of I/O register 10a.

A second counter 62 receives input pulses from gate circuit 64 over control line 66. Gate circuit 64 is connected to bit clock 40 and to output line 56 of control flipflop 54. It releases bit clock pulses to control line 66 when the control flipflop is set, i.e. when control signal C is active.

A comparator 68 is connected to the output of the second counter and to the middle field of the I/O register. It supplies a reset signal over line 60 to second counter 62 and to control flipflop 54 when the second counter value equals the contents of the middle field.

A decoder 70 is connected to the right field of I/O register 10a and directly receives the contents of the latter. At any instant, at most, one of the control lines leading to gating circuits 72, 74, . . . 76, 80 and 90 is energized, resulting in selective gating of the bit clock signal from line 66 to one of the gate circuit output lines 42, 44, . . . 46, 82 or 98 respectively. This releases data bits at the bit clock rate from the output of the respective register (or gate 92).

Shift register 84 contains a synchronizing pattern which is transmitted at the beginning of each frame. Its output is connected to OR gate 34, and there is also a feedback connection to its input, so that the synchronizing pattern is recirculated and again available immediately as it is sent.

Flipflop 86 with input line 88 serves for determining a certain state (explained further below) which is forwarded as an indicator bit via line 96, gating circuit 92 and line 94 to OR gate 34 and further to line 38.

A gating circuit 78 is connected to bit clock 40 and to one output (line 52) of control flipflop 54. Its output furnishes the bit clock signal via line 48 to the output of buffer 18 when the D signal is active (control flipflop reset).

OPERATION

For each time slot which is assigned to an input channel for synchronous transmission, the associative store contains in one of its rows the position number of the starting bit, the time slot width given as a count of bits, and the assigned channel number, or register number (address) respectively.

Furthermore, one time slot is provided for the synchronizing character, and the row before the last is assigned to it. The starting bit position is 001 (second bit of frame), and length $x$ corresponds to the number of bit positions in shift register 84.

In addition, one more time slot comprising only one bit position is provided for an indicator bit which represents the start of each frame. The last storage row containing start bit position value 1 and length value 001 corresponds to it. The significance of the start bit which precedes the synchronizing character is explained further below.

Contents of first counter 50 is stepwise increased by the bit clock signal. Its current contents specifies the bit position in the frame which is currently transmitted. The counter's capacity corresponds to the number of bits in a frame so that it automatically returns to zero at the beginning of a frame.

It is now assumed that the current value in the counter is $i$, and that the $i^{th}$ bit position is located in a gap between slots reserved for circuit switched data.

Therefore, control flipflop 54 is in its reset state (signal D active). Packeted data is extracted from buffer 18 and transferred during this gap. First counter 50 is stepwise incremented. Simultaneously, an associative search on the first counter value is effected because signal D is active.

As soon as a match is recognized, i.e. when the next time slot assigned to a synchronous input channel starts, contents of the respective row is transferred to the I/O register and control flipflop 54 is set. As a result, signal D becomes inactive and the search process is suspended. Signal C becomes active, so that one of the gating circuits 72, 74, . . . 76 which is associated to the respective channel is enabled in accordance with the bit clock. Consequently, during the interval of that time slot data bits are released from the correct register to output circuits 34, 36, . . . 38 in accordance with the bit clock. When inputs to comparator 68 agree flipflop 54 and counter 62 are reset.

This alternation between output of data bits from a selected one of registers 12, 14, . . . 16 on one hand, and from buffer 18 on the other hand continues until the end of the frame cycle, and then reiterates.

At the beginning of each frame, the last row and the second last row of the associative store are read out. This results in enablement of gates 90 or 80, respectively, and in the transfer of a status bit from flipflop 86 (into bit position 000) and of the synchronizing pattern from register 84 (into bit positions 001 through $x$ of the frame).

Signal D becomes active upon conclusion of each assigned time slot; i.e. when asynchronous data are to be released. Signal C is active during those intervals which correspond to time slots that are assigned to synchronous transmission (the two time slots for the transmission indicator bit and the synchronizing pattern at the frame start are also part of these).

DEMULTIPLEXER

On the receiving side of the transmission means a demultiplexer (as DMPXA in FIG. 1) is provided which is analogous to the multiplexer just described. The associative store has the same contents, and the received data bits are distributed either to output channel registers (circuit-switched synchronous traffic) or to an output buffer (intermediately stored asynchronous traffic). The demultiplexer further comprises a distribution means corresponding to the editing means, which distributes — in accordance with the control and identification characters that were added by the editing means — the bit stream from the output buffer to the output lines, the number of which is equal to the number of input lines 28 through 32.

ALLOCATION OF TIME SLOTS (FIG. 5)

The time slots assigned to input channels are determined by the entry of starting bit position and number of bits (width) in the associative store. Corresponding entries are contained in a first list, in a section of not-shown system main store provided for this purpose.

The gaps, available between time slots in the time frame, which are used for transmission of asynchronously arriving and buffered data packets are referenced in a similar way in a second list by their starting bit positions and their widths. This list is also contained in the main store of the system. Further, in a given storage location the minimum bandwidth M (number of bits, see FIG. 3) is represented which must always be available for asynchronous traffic, and in a second given storage location the sum L of all gaps, i.e. the total bandwidth currently available for asynchronous traffic. A third main storage location contains data on the width S1 (number of bits) of the current largest gap (see FIG. 5).

If now a request is presented for allocation of a time slot for transmission (circuit-switched) requiring bandwidth W, a procedure is followed which is represented in FIG. 5. Row $a$ shows the current partitioning of the time frame. Time slots already allocated for synchronous traffic are hatched.

Initially it is determined whether after allocation of a time slot of width W the minimum bandwidth M for asynchronous traffic will still be available, i.e. whether $L - W \geq M$. If this is not the case, the request is rejected.

Next, it is determined whether the requested bandwidth is smaller than the largest available gap, i.e. whether $W \leq S1$. If this is the case, width W is compared to all gap widths Si and the allocation is made where the smallest positive difference exists. The values for the new time slot (i.e. starting bit position and width) are set, together with the associated channel address, into the first list and into the associative store. The list of gaps and the value of sum L for all gaps are updated accordingly. This corresponds to row $b$ in FIG. 5.

If, however, none of the available gaps is sufficient for the requested time slot width, i.e. if $W > S1$, a split is made by distributing the traffic of the requesting channel to two (or more) time slots, cf. row $c$ in FIG. 5. The first of these time slots is made equal to the widest available gap (S1) and lists and parameters are updated correspondingly. For the remaining bandwidth R still to be allocated the same procedure is followed as if a normal new request were received, cf. row $b$, or row $c$, respectively. The final result is that for one input channel two (or more) time slots are used and therefore two (or more) entries are contained in the stores, the channel number (channel address) in all entries belonging to a group being the same.

When the time slot (or time slots, respectively) assigned to a synchronous traffic channel is released the corresponding entry in the associative store is deleted, and the lists and parameter values are updated accordingly. The gap thus generated is then again available for asynchronous traffic.

Procedures required to operate in accordance with above described principles are deemed standard and, therefore, no additional description of details is necessary.

OPERATIONS FOR AN ALLOCATION CHANGE

When the allocation of bandwidth, or time slots respectively, is changed contents of the associative stores on both sides of the transmission means, i.e. in the multiplexer as well as in the demultiplexer, must be changed in the same way. If in the required signaling process a delay occurs it can happen that the new contents of a row of the associative store is available in the demultiplexer a few frame cycles later than in the multiplexer. This would, of course, result in errors such that e.g. data from a synchronous input channel which are transmitted in a newly allocated time slot are interpreted as asynchronous (store-and-forward-switched) data and thus are transferred into the buffer store for data packets.

For resolving this problem the procedure described below is applied. Additional circuits required are shown in FIG. 4, and reference is made thereto in the explanation.

Four different states are defined for the associative store rows and they are represented by two additional bits (the transmission mask); active = 11, passive = 00, transition from active (to passive) = 01, and transition to passive (from active) = 10.

When a new time slot is established for synchronous traffic rows of the associative stores are loaded and activated as follows: First, the new row contents (3 fields = starting bit position, bit count, channel number) are sent to the demultiplexer and loaded there, together with transition mask 10, into a free (passive) storage row. These data are ignored, however, because of the mask 10. An acknowledgement message is then sent to the multiplexer. There, upon receipt of the acknowledgement, the same row contents are set into a free (passive) storage row, together with the same mask 10. Simultaneously, a flipflop is set (86 in FIG. 4). The output signal of the flipflop causes at the beginning of the next frame cycle: a) insertion of an indicator bit into the first bit position of the frame, for notifying the demultiplexer, and b) a search process for finding the transition mask 10, and its subsequent alteration into 11. Thereafter, the new row contents are effective in the multiplexer.

Within the same frame cycle, the demultiplexer first receives the indicator bit by which a flipflop is set. The output of this flipflop also initiates a search process for finding the transition mask 10 and its subsequent alteration into 11. Thereafter, the new row contents is also active in the demultiplexer so that the received data are gated correctly.

When a time slot is eliminated the corresponding associative row store contents need not be deleted but only passivated. Steps for this operation are the same as those just described, except that no field contents (starting bit position, etc.) are transferred and loaded and that the masks used are initially 01 (row contents still valid) and will finally be 00 (row passive).

The necessary circuitry additions for the multiplexer are shown in FIG. 4 (for the demultiplexer, the circuit elements are analogous and therefore need not be shown). The two bit positions for the transition mask can be seen in the associative store 10 and in I/O register 10a at the right side. Flipflop 86 is set when the mask 01 together with the new row contents, or the mask 10 respectively, is set. This is caused by a signal T (transition) on line 88. For inserting the indicator bit into the first position of the next frame there are provided gating circuits 90 and 92, line 94, and the contents of the lowest row in the associative store. When the first bit (000) of a frame is available, channel address Q is read out to open gating circuit 90 via decoder 70. Since gating circuit 92 is also opened because line 96 is active, the signal from line 66 is gated to line 94 and thus causes generation of the indicator bit on line 38. The pulse on line 94 also resets flipflop 86 and further initiates the search and alteration process for the transition masks.

Subsequently, when the second last row of the associative store is read out the synchronizing pattern is transferred from register 84 to the transmission line, as explained above. During this time the search and alteration process for the transition masks can be executed so that the respective storage row is activated (or passivated, respectively) within the current cycle.

While the invention has been particularly shown and described with reference to preferred embodiments thereof, it will be understood by those skilled in the art that various changes in form and detail may be made therein without departing from the spirit and scope of the invention.

What is claimed is:

1. Multiplexing device for handling circuit-switched and store-and-forward traffic in time multiplex over a common communication facility, characterized by
   a. a plurality of source register means (12, 14, 16) associated with respective sources (22, 24, 26) of a first subset of sources of circuit-switched traffic;
   b. buffer storage means (18) for storing and sequentially releasing data from associated sources (28, 30, 32) of a second subset of sources of store-and-forward traffic;
   c. assembler means (34) for transferring data alternately from said source register means and said buffer storage means to an input (36) of said common communication facility (38);
   d. first selection means (10a, 42 . . . 46, 50 . . . 76) for selectively activating source register means outputs to effect release of data elements to said assembler means during discrete sub-intervals of repetitive frames in accordance with control data stored in a control store (10) which is connected to the selection means; and
   e. second selection means (52, 54, 48, 78) for activating the buffer storage means to release data elements to said assembler means only during discrete time gaps between said discrete sub-intervals.

2. Multiplexing device according to claim 1, characterized in that an associative store, provided as control store (10), contains in each row at least three fields for a start bit position identification, a time slot width value, and a channel register number.

3. Multiplexing device according to claim 1, characterized in that the first selection means comprises first counting means (50), second counting means (62), comparing means (68), and decoding means (70) which cooperate with an input/output register (10a) of the associative store (10) in such a way that either a search operation is executed on the first fields of the associative store using the contents of the first counting means as search argument, or that a comparison is made between a value read from a second field of the associative store, and the contents of the second counting means, while simultaneously the decoding means (70) due to decoding of a value read from a third field of the associative store generates a control signal on one of its output lines, which activates a gating circuit (72, 74, 76) for gating bit clock signals to an associated source register means (12, 14, 16).

4. Multiplexing device according to claim 3, characterized in that for each storage row of the associative store two additional bit positions are provided for containing a mask pattern, and that a latch circuit (86) and additional control signal elements (90,92) are provided in connection with the first selection means (10a, 42 . . . 46, 50 . . . 76) and the assembler means (34) for releasing, in the first bit position of a frame, a certain bit value to the transmission means, if the latch is set, and for simultaneously providing on a particular control signal line (94) a mask modification signal which also serves for resetting the latch.

5. A method of using a multiplex communication facility having a predetermined frame/bandwidth capacity to carry multiplexed information traffic, including circuit-switched and store-and-forward components, relative to switching facilities serving multiple sources of individual components of both types comprising:
   mapping said frame capacity into variably distributed discrete first and second portions which are fragmentably interleavable and are characterized in that said first portion is regulated to contain at least a predetermined minimum capacity M capable of handling the aggregate store-and-forward traffic without blocking (over-run);
   assigning said second portion exclusively to circuit-switched traffic;
   assigning said minimum capacity M variably distributed within said first portion exclusively to store-and-forward traffic; and
   assigning any remaining capacity in said first portion, in excess of said minimum capacity M, variably and selectively to circuit-switched and store-and-forward traffic components.

6. A method according to claim 5 including:
   maintaining corresponding assignment data, at communicating/terminals of said facility, suitable for securing correct demultiplexing of said multiplexed traffic components;
   reserving a predetermined third portion of said frame capacity to convey transition indications indicating frames in which changes in said mapping and assignments are initially rendered effective; and
   utilizing received said transition indications to synchronize the demultiplexing of frames having changed assignments to the actual rendering effective of respective changes.

7. A method according to claim 5 wherein said frame is a time division frame having time sequential bit-slot positions and said partitioned portions assigned to said circuit-switched components comprise multi-bit-slot segments assigned to individual components, said segments designated by respective changeable data characterized by:

indicating the frame position of the respective first bit slot and the respective bit length of the segment.

8. A method according to claim 5 wherein said frame is a time division frame having multiple time-ordered uniform bit slots characterized in that said circuit-switched traffic may be contained in multi-bit slot channels of various duration with multi-bit gaps in and between channels; said gaps aggregately comprising at least said minimum capacity M of said first portion; and wherein assignments of capacity in said gaps to circuit-switched traffic newly eligible for connection is effected by:

selecting a portion of a "best fitting" gap for assignment as the respective channel when the newly eligible traffic is accommodatable in a single existing gap; and in the alternative establishing the required channel distributively in the total capacity of at least one gap plus a portion of a "best fitting" gap.

9. A method according to claim 5 wherein changes in said mapping and assignments are rendered effective synchronously at multiplexing and demultiplexing terminals pairably linked by said communication facility, characterized by:

reserving a particular portion of each frame to selectively convey validation indicator data between said linked terminal pair in synchronism with the effective adoption of a changed assignment at the multiplexing terminal of the pair.

* * * * *